June 21, 1955 G. B. HILL 2,711,063
ADJUSTABLE SUSPENSION FOR STALK SHREDDER
Filed Oct. 28, 1952 3 Sheets-Sheet 1
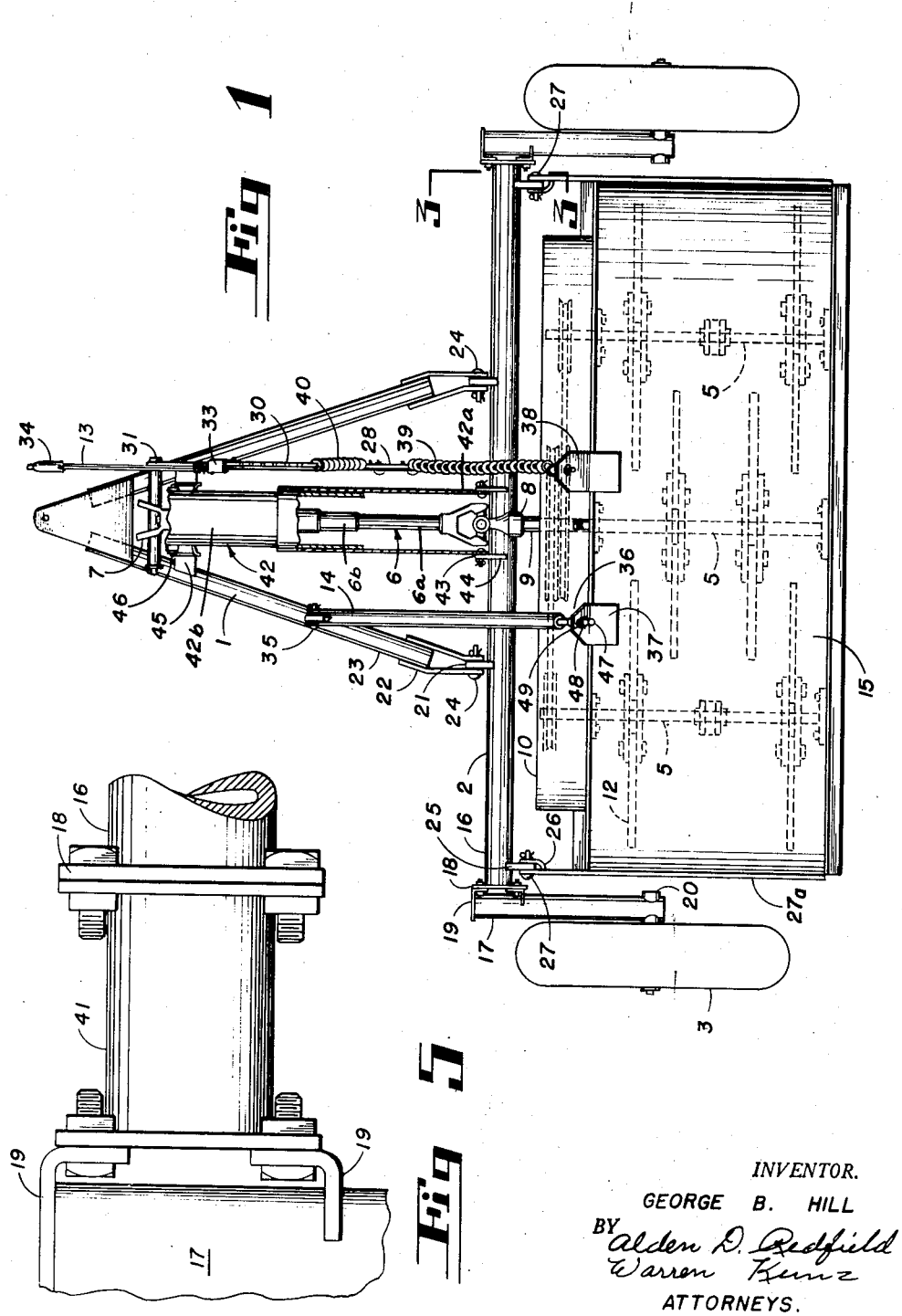
INVENTOR.
GEORGE B. HILL
BY Alden D. Redfield
Warren Kunz
ATTORNEYS.

June 21, 1955  G. B. HILL  2,711,063
ADJUSTABLE SUSPENSION FOR STALK SHREDDER
Filed Oct. 28, 1952  3 Sheets-Sheet 2

INVENTOR.
GEORGE B. HILL
BY
ATTORNEYS.

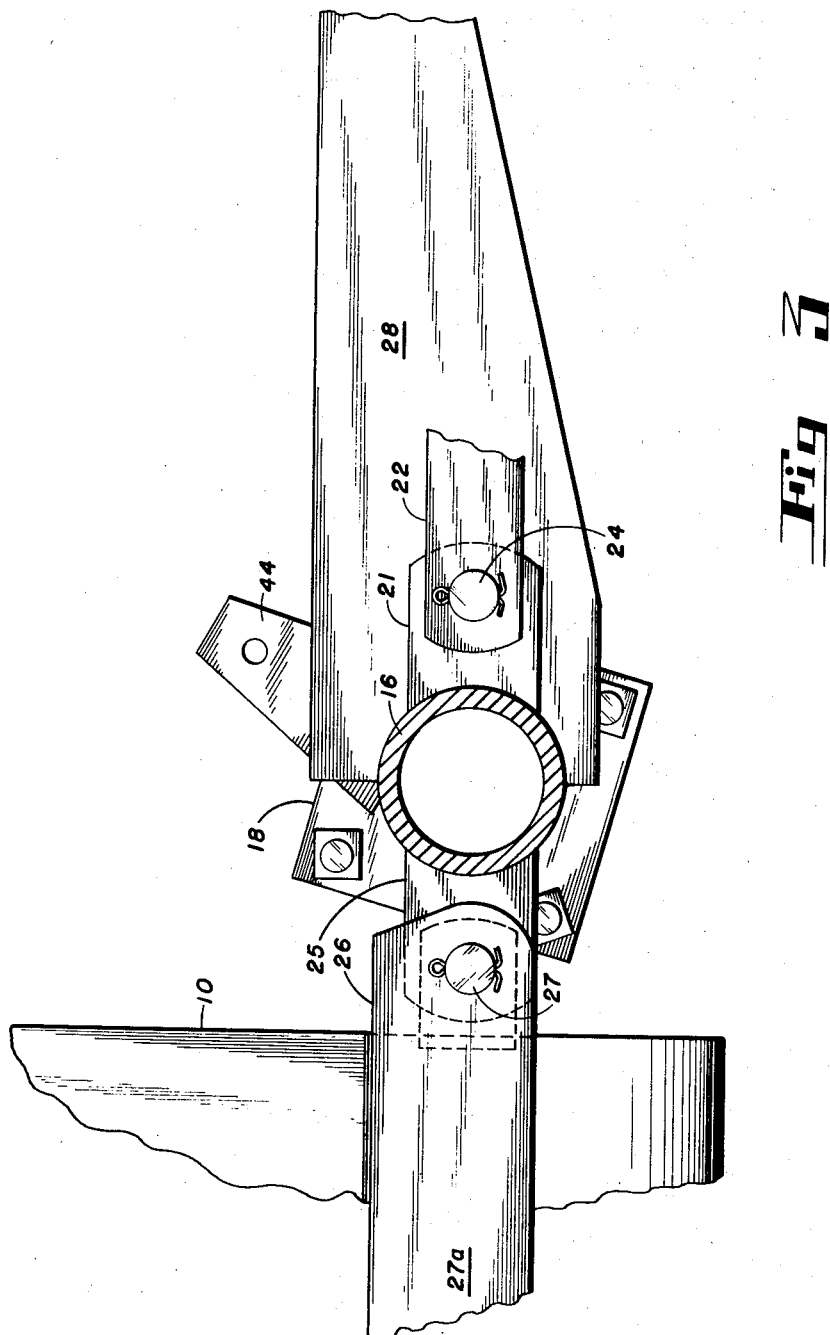

United States Patent Office 2,711,063
Patented June 21, 1955

2,711,063

ADJUSTABLE SUSPENSION FOR STALK SHREDDER

George B. Hill, Celina, Ohio, assignor, by mesne assignments, to Avco Manufacturing Corporation, Cincinnati, Ohio, a corporation of Delaware Application October 28, 1952, Serial No. 317,297

10 Claims. (Cl. 55—118)

The present invention relates generally to a mobile stalk shredder, particularly one which may be used to disintegrate corn stalks and the stems of maize, sorgo, and the like. The invention relates more particularly to a novel adjustable suspension for such a machine and provides means for automatically maintaining the shredding mechanism substantially parallel to the ground level regardless of its position of vertical adjustment.

The present invention finds use in a stalk shredder of the type having a shredding mechanism including horizontal rotary shafts carrying pivoted hammers, or flails, designed to smash and disintegrate stalks on the ground as the shredder passes over them. In machines of this type, it is important that the shredding mechanism be adjustable relative to ground level so that the machine can be used to disintegrate various types of vegetable matter and so that it can be adjusted for maximum efficiency of operation regardless of the density of material being shredded, or the nature of the terrain encountered. Presently known machines of this type are heavy, cumbersome and uneconomical to produce and to use, since the adjusting elements for vertically positioning the shredding mechanism are entirely separate from the principal structural elements of the shredder proper. Aside from the uneconomical use of materials in such machines, the excessive weight is conducive to high intertia loading and mechanical failure when used on rough terrain.

The present invention provides a novel and improved adjustable suspension which has particular utility in a stalk shredder but which may be used to advantage with other types of machines having operating parts which must be adjusted vertically while being maintained parallel to the ground level. Briefly stated, the present invention comprises a rigid U-shaped tubular frame to the distal ends of which ground wheels are rotatably secured. The central portion of the frame is transverse to the direction of travel and is pivotally secured to a draft tongue which, in turn, is attached to the draw bar of a tractor or other draft device. The shredding mechanism is pivotally supported by the central transverse portion of the frame and is maintained in an upright position by a link which extends from the top of the shredding mechanism to an intermediate portion of the draft tongue.

Vertical adjustment of the shredding mechanism is affected through a control lever which is rigidly secured to the transverse portion of the frame and extends forwardly to a point adjacent the tractor to facilitate adjustment by the tractor operator. As the adjusting lever is swung vertically in an arcuate path, the U-shaped frame is swung arcuately about the center of the ground wheels. The motion of the frame and the link, transferred to the shredding mechanism through the associated pivotal connections, effects vertical adjustment and maintains it substantially parallel to the ground level.

In view of the foregoing, it will be obvious that it is broadly an object of the present invention to provide an improved adjustable suspension for a stalk shredder.

A more specific object of the invention is the provision of an improved adjustable suspension for a shredder which will facilitate vertical adjustment while maintaining the shredding mechanism parallel to the ground level.

Another object of the invention is the provision of a strong rigid lightweight adjustable frame for a stalk shredder and one which serves not only to support and strengthen the shredding mechanism but also to effect its vertical adjustment.

A still further object and advantage of the invention is the provision of an adjustable frame including a transverse member directly in front of the shredding mechanism in position to deflect stalks to be disintegrated in a direction parallel to the travel of the machine whereby the stalks are positioned advantageously for efficient shredding by the hammers, or flails, of the shredder without the need for special or separate deflectors.

A specific object of the invention is the provision of an adjustable shredder suspension which can be readily adjusted in width for use in fields having furrows of different lateral spacing.

The novel features that I consider characteristic of my invention are set forth in the appended claims; the invention itself, however, both as to its organization and method of operation together with additional objects and advantages thereof, will best be understood from the following description of a specific embodiment of my invention when read in conjunction with the accompanying drawings, in which:

Figure 1 is a top plan view of a stalk shredder incorporating the novel adjustable suspension of the present invention;

Figure 3 is an enlarged cross sectional view taken on plane 3—3 of Figure 1 showing the structural relationship of various elements of the suspension;

Figure 5 shows to an enlarged scale the top plan view of a spacer used with the suspension for increasing the span between the ground wheels.

General arrangement

Figure 2:
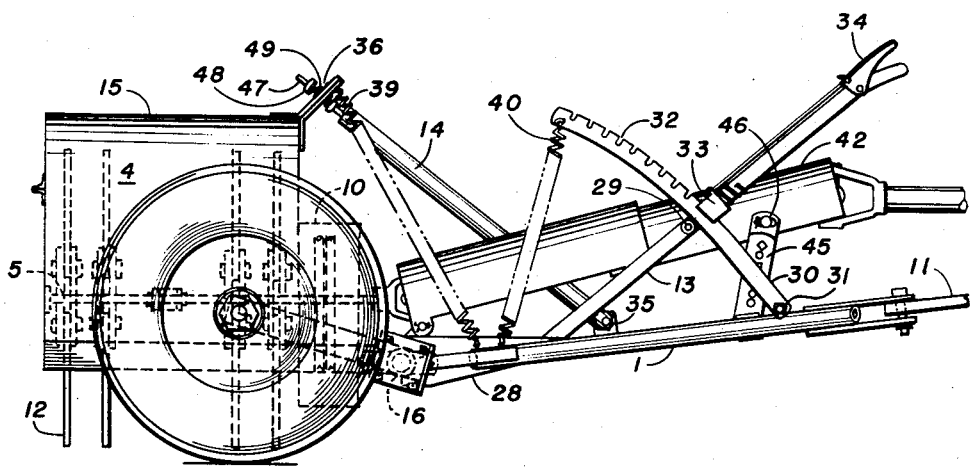
Figure 2 is a side elevational view of the stalk shredder shown in Figure 1.

As illustrated in Figures 1 and 2, the present invention finds particular utility in a stalk shredder including a draft tongue 1 and a combination suspension and structural frame 2 provided with ground wheels 3 for movably supporting shredding mechanism 4. This mechanism includes a plurality of horizontal rotary shredding shafts 5 extending parallel to the direction of travel of the machine. The shafts are power driven through a power take-off shaft 6 which may be attached at its forward end 7 to the power take-off connection (not shown) of a tractor. The rear end 8 of the power take-off shaft may be directly attached to the forward end 9 of the central horizontal shredding shaft. Drive pulleys, or sprockets (not shown) may be provided within hood 10 for transmitting power from shaft 9 to the other shredding shafts. For a more complete disclosure of such drive pulleys, reference may be had to Figure 1 of the Sells et al. Patent 2,500,914 wherein the pulleys are indicated by reference numerals 34, 35, and 36.

In conventional manner, draft tongue 1 is secured to draft bar 11 of the tractor. As will be understood by those skilled in the art, the machine is adapted to be drawn by the tractor across a field having stalks or vegetation requiring shredding. As the machine traverses the field, the shredding shafts are driven by the power take-off shaft, and hammers 12, associated with the shredding shafts, are rotated at high speed in planes perpendicular to the direction of travel. As will be explained more fully later in this specification, the shredder is usually adjusted so that the hammers just touch the surface of the ground in the course of their rotary movements. The hammers, which may be hardened steel bars, strike the stalks and smash them into small particles, which are easily plowed under, facilitating subsequent working of the ground and planting. Furthermore, disintegration of the stalks destroys corn borers, and other undesirable insects, and reduces infestation in later crops raised on the same field.

It is important in a machine of this type that the elevation of the shredding shafts be adjustable relative to the ground level. When the shredder is used in fields having pronounced furrows, it is necessary to raise the shredding shafts to prevent too great an impingment between the hammers and the ground. On the other hand, the shafts can be closer to the ground level when the shredder is used for disintegrating stalks in a substantially flat field. It will also be understood that the shredder shafts may have to be raised if the shredder is used on rough terrain. Adjustment is also desirable to improve operating efficiency in accordance with the density of the stalks being shredded.

An advantage of the present invention is the disposition of a transverse member immediately in advance of the shredding mechanism 4. The transverse member tends to engage standing stalks and to force them forwardly in the direction of travel of the shredder. The stalks, when forced forward, are ideally positioned for shredding by the hammers which rotate in planes perpendicular to the direction of travel. Thus the hammers impinge perpendicularly against the stalks and shredding efficiency is improved.

In prior art devices such operation could only be attained through the provision of special deflectors to bend the stalks forwardly as the machine advanced. By virtue of the arrangement of this machine, special or separate deflectors are entirely unnecessary.

Adjustable suspension

The adjustable suspension includes three basic components: The draft tongue 1; a rigid U-shaped frame 2 having an adjusting lever 13 rigidly secured to it; and a link 14 extending between the draft tongue and the top of housing 15 of the shredding mechanism.

The U-shaped frame 2, which is of primary importance in this invention, is well illustrated in Figures 1 and 3. With particular reference to Figure 1, it will be noted that the frame includes a transverse tubular member 16 from which tubular side members 17 project rearwardly, attachment of the side members to the transverse member being made through mounting plates 18 and brackets 19 rigidly secured to members 16 and 17, respectively. The distal ends of members 17 carry stub axles 20 which project laterally and rotatably support ground wheels 3.

Forwardly extending lugs 21 are rigidly secured to transverse member 16 symmetrically with respect to the longitudinal center line of the machine. These lugs engage clevises 22 which are rigidly secured to divergent tubular members 23 constituting integral portions of the draft tongue 1. Clevis pins 24 pivotally secure the clevises 22 to the lugs 21.

The transverse tubular member 16 also is provided with another set of lugs 25 which extend rearwardly into engagement with clevises 26. These clevises are formed integrally with structural members 27a which extend forwardly from the shredder housing 15. Clevis pins 27 provide pivotal attachment between lugs 25 and clevises 26.

With particular reference to Figures 2 and 3, it will be noted that a rigid forwardly extending plate 28 is rigidly secured to transverse member 16. Adjusting lever 13 is bolted, or otherwise secured, to plate 28. It is important to note, therefore, that the adjusting lever 13, plate 28, and transverse member 16, are effectively a single rigid body which moves as an entity during the adjustment of the machine.

A guide roller 29 is pivotally attached to adjusting lever 13 in position to guide along the lower edge of a latch bar 30. This latch bar is pivotally attached at 31 to the forward portion of the draft tongue and is provided with notches 32 for engagement with a latch 33 which is slidably and adjustably positioned on the upper portion of adjusting lever 13. A conventional hand release 34 at the upper end of the adjusting lever may be compressed to effect disengagement of latch 33 from the notches 32 so that the adjusting lever may be swung in a vertical plane and fixed in any desired position of adjustment, as will be described more fully later.

As has already been pointed out, the shredding mechanism is pivotally attached to member 16 by clevis pins 27. A link 14 is pivotally secured to the draft tongue at 35 and to the top of the shredder housing at 36. This link, in cooperation with the pivot pins 27, secures the shredding mechanism to the other elements of the suspension and imparts to the mechanism various positions of adjustment, depending upon the position of the adjusting lever 13. As illustrated in Figure 1, link 14 is engaged with an ear 37 which provides the point of pivotal attachment 36 at the top of the shredder housing.

Another ear 38 is also provided at the top of the housing and serves as a point of attachment for a counterbalancing spring 39 which extends between ear 38 and plate 28. As the shredding mechanism is lowered in the course of its adjustment, spring 39 is stretched and energy is stored for aiding in the subsequent raising of the mechanism.

Another spring 40 extends between the top end of latch bar 30 and plate 28 for holding the latch bar in bearing engagement against roller 29 at all times.

It is important to note the angular relationship between lugs 21 and 25, plate 28, and the transverse tubular member 16. As will be understood more fully from the description of the operation of this machine, these elements cooperate to maintain the shredding mechanism substantially parallel to the ground level regardless of the position of adjustment.

A cardinal feature of the present invention is that the transverse member 16 forms an integral part of the suspension and adjusting mechanism. Further, the transverse member also serves to strengthen and firmly support the lower forward corners of the shredding mechanism. Thus, this member performs two entirely different functions which makes for economical use of materials, and provides a strong lightweight machine. On the other hand, the side members 17, in cooperation with the transverse member 16, have sufficient inherent resiliency to cushion to some extent the shock loads imparted to the wheels as rough terrain is traversed. It will be obvious to those skilled in the art that it is highly desirable to reduce to a minimum the stresses to which the various joints of the machine are subjected by such shock loading. For like reasons, the lightweight construction of this machine is advantageous since inertia loads are kept to a minimum.

In view of the foregoing description of this invention, it will be appreciated that for each height of the shredding mechanism there is a unique position for each of the associated suspension elements. This being the case, it will be obvious that means must be provided for adjusting the relationship of these various elements to accommodate attachment of the shredder to tractors having different tractor drawbar heights. To facilitate such adjustment, the upper end 47 of link 14 is threaded and is provided with a pair of nuts 48 which can be threadedly adjusted along 47 to effectively change the length of the link 14. The nuts straddle ear 37.

The shredder can be brought into operative adjustment by being attached to the tractor by which it is going to be drawn. The adjusting lever 13 can be then moved to any desired position of adjustment after which nuts 48 can be threaded along end 47 of link 14 until the shredding mechanism 4 has been moved into a position substantially parallel to the ground. No further adjustment is necessary; the machine is then ready for use.

It is desirable that link 14 be resiliently connected to ear 37. It has been found convenient to place two short coil springs 49 between nuts 48 and ear 37. These springs held absorb shock loads and permit slight flexibility between link 14 and ear 37 necessary for relative movement during vertical adjustment of the shredding mechanism.

Operation

Figure 4:
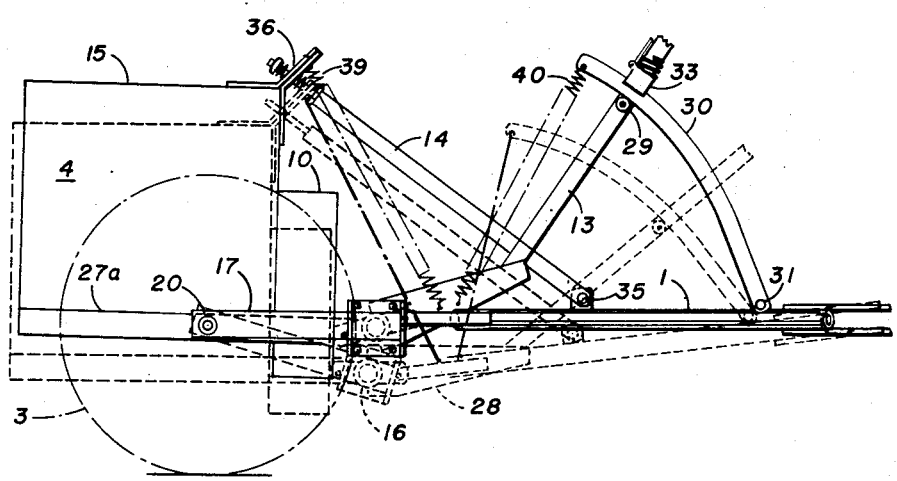
Figure 4 is a schematic drawing indicating in dash and full lines two positions of adjustment of the shredder.

The operation of the adjustable suspension can be understood from a study of Figure 4 which shows in dash lines the lowermost position assumed by the suspension when the shredding mechanism is closest to the ground. In this same figure, these elements are shown in full lines in an alternate position assumed when the shredding mechanism is raised. For a full understanding of this invention, it should be realized that during adjustment of the shredding mechanism the ground wheels 3 must remain in ground contact, and that the forward end of the draft tongue 1 remains in pivotal attachment with the draft bar 11 of the tractor at a substantially constant height above the ground.

With these thoughts in mind, consideration should be given to the movement of the U-shaped frame 2 as it is rotated. To facilitate illustration, this framework is shown as pivoting around the centers of the ground wheels. The pivotal raising movement of the frame is produced by raising the adjusting lever 13, the roller 29 on the adjusting lever guiding beneath the latch bar, and the latch 33 being engaged with any suitable notch 32, as required to maintain the desired position of adjustment.

During the time that the transverse portion 16 of the frame is raised, clevis pins 27 are also raised and are carried slightly farther forward relative to the centers of the ground wheels than they were in the initial starting position. This inherently produces a slight forward movement of the bottom of the shredding mechanism 4. At the same time that the U-shaped frame is being swung about the center of the ground wheels, the rear end of the draft tongue is also being raised, the forward end remaining at the same elevation determined by the height of the tractor bar. The raising movement of the draft tongue causes pivot point 35 to move farther forward relative to the center of the ground wheels than it was in the initial position. This slight forward shift is transmitted through link 14 to the top of the shredding mechanism.

The forward shift imparted to the top of the shredding mechanism is substantially equal to the slight forward shift at the bottom of the shredder, with the result that the shredding mechanism remains throughout the adjustment substantially parallel to the ground. This is important since efficient shredding requires that all of the hammers engage the ground, or the stalks on the ground, in substantially the same manner. Operation would not be satisfactory if certain of the hammers, such as the rear hammers, tended to dig into the ground while the forward hammers barely engaged the ground. Use of the present invention avoids this difficulty.

Whereas in Figure 4 the U-shaped frame 2 is shown as pivoting about the centers of ground wheels 3, with the result that the forward end of the draft tongue 1 is shown to move forwardly and rearwardly during adjustment, it should be appreciated that in actual use the forward end of the draft tongue might remain firmly attached to the draft bar of a parked tractor and that, as a result, the slight longitudinal shift of position of the elements would have to be offset by slight movements of the ground wheels. The operation of the suspension is the same regardless of which point is taken as the fixed point of reference.

In this connection, it is important to note that adjustment of the shredder can readily be affected while it is in use and that it is not necessary that the tractor remain stationary while adjustments are being made.

Adjustment of wheel span

Since the distance between furrows may vary in different fields and on different farms, it is desirable to provide means for changing the span between the ground wheels of the shredder.

With reference to Figure 5, it will be noted that a spacer 41 can be inserted between the mounting plate 18 and the brackets 19 to increase the span between the wheels. In this way, the length of the transverse member is effectively increased and the machine is adapted to use under various conditions.

It is important to note that the wheel span can be increased without affecting in any way the relative positions of the various suspension members and that it is not necessary to dismantle any of the principal components of the machine. It is also noteworthy that use of spacers 41 does not sacrifice any of the advantages of the machine.

Power drive for shredder

Although the power take-off shaft 6 does not constitute part of this invention, it may be well to point out that this shaft is conventional and includes telescopic sections 6a and 6b (see Fig. 1) to accommodate the change of length caused by movement of the draft tongue relative to the shredding mechanism. The power take-off shaft is surrounded by a conventional sheet metal shield 42 which may likewise be telescopic in nature, including telescopic parts 42a and 42b. This shield may be pivotally supported, as at 43, by a central set of lugs 44 secured rigidly to transverse member 16.

The power take-off shaft, as has been explained, extends between the forward end 9 of the central shredding shaft and the power take-off connection of the tractor (not illustrated). A pair of brackets 45 are pivotally attached to the forward part of the draft tongue, and support at 46 the forward end of the power take-off shaft. This construction permits the use of two universal joints, thereby precluding any problems of alignment between the central shredding shaft and the power take-off connection of the tractor.

In view of the foregoing description, it will be apparent that I have invented an improved adjustable suspension for a stalk shredder and one which is particularly effective in both supporting and adjusting the shredding mechanism while maintaining its position parallel to the ground level.

Having described a preferred embodiment of my invention, I claim:

1. In combination in a stalk shredder, a rigid U-shaped tubular frame having a transverse member secured to and disposed between rearwardly extending side members, ground wheels rotatably secured to the distal ends of said side members, a shredding mechanism pivotally secured to said transverse member between said side members, a draft tongue pivotally secured to said transverse member and extending forwardly away from said shredding mechanism, an adjusting lever rigidly secured to said transverse member, a latch bar engaged by said adjusting lever, said latch bar being pivotally secured to said draft tongue near its forward end, and a rigid link extending between the top of said shredding mechanism and a point on said draft tongue intermediate the forward end and points of pivotal attachment with said transverse member.

2. In combination in a stalk shredder, a rigid U-shaped frame including a transverse member, ground wheels rotatably secured to said frame, a shredding mechanism pivotally secured to said transverse member and supported thereby, a draft tongue pivotally secured to said transverse member and extending forwardly therefrom away from said shredding mechanism, adjusting means secured to said transverse member and cooperating with means on said tongue whereby the angular disposition of said tongue and said frame can be varied and fixed in a selected position, and a rigid link extending between said shredding mechanism and said tongue, whereby said shredding mechanism is held upright while being adjustable relative to the ground level.

3. In combination in a stalk shredder, a U-shaped frame including a rigid transverse member, ground wheels secured to the distal ends of said frame, a shredding mechanism pivotally secured to and supported by said transverse member, a draft tongue pivotally secured to said transverse member opposite said shredding mechanism, means connected to said transverse member and said tongue for adjusting the relative angular disposition therebetween, and a link extending between said shredding mechanism and said tongue.

4. In combination in an improved stalk shredder, a rigid U-shaped tubular frame including tubular rearwardly extending side members and a rigid tubular transverse member fixedly attached to and extending between said side members, ground wheels rotatably supported by the distal ends of said side members, a shredding mechanism pivotally secured at its lower forward corners to said transverse member, a V-shaped draft tongue having divergent side members pivotally attached to their rear ends to said transverse member, an adjusting lever rigidly secured to said transverse member for adjustment in a vertical plane above said draft tongue, a latch bar pivotally secured to said draft tongue adjacent its forward end, said latch bar being cooperatively disposed for engagement by said adjusting lever, said adjusting lever being movable to adjust and fix the relative angular position of said frame to said draft tongue, a rigid link extending between the top of said shredding mechanism and a point on said draft tongue intermediate its forward end and its points of attachment to said transverse member, and a counterbalancing spring extending between the top of said shredding mechanism and said transverse member adjacent the point of attachment of said adjusting lever.

5. Apparatus as defined in claim 4 in which said latch bar is arcuate, and, in addition, a guide roller on said adjusting lever for maintaining said latch bar in cooperative disposition with said adjusting lever.

6. Apparatus as defined in claim 5, and, in addition, spacing means between said transverse member and said side members whereby the span of said ground wheels is increased.

7. In combination, a stalk shredder comprising a U-shaped frame including a rigid transverse member, a shredding mechanism pivotally secured at its lower portion to said transverse member and supported thereby, draft means pivotally secured to said transverse member, adjusting means connected to said frame and said draft means for adjusting and fixing the angular disposition therebetween, a rigid link extending between said shredding mechanism and an intermediate point on said draft means, said link holding said shredding mechanism in substantially upright position while it is adjusted vertically through change in the angular relationship between said draft means and said frame.

8. In combination in a stalk shredder, a rigid frame having a transverse member secured to and disposed between rearwardly extending side members, ground supporting means secured to said side members remote from said transverse member, a shredding mechanism pivotally secured to said transverse member between said side members, a draft tongue pivotally secured to said transverse member and extending forwardly away from said shredding mechanism, adjusting means secured to said transverse member, and means extending between said shredding mechanism and said draft tongue for holding said shredding mechanism in upright position.

9. In combination in a stalk shredder, a rigid frame having a transverse member secured to and disposed between side members which extend perpendicularly from said transverse member, ground supporting means secured to said side members remote from said transverse member, a shredding mechanism pivotally secured to said transverse member, a draft tongue pivotally secured to said transverse member opposite said shredding mechanism, an adjusting lever secured to said transverse member, and a rigid link extending between said shredding mechanism and said draft tongue.

10. In combination in a stalk shredder, a rigid frame having a transverse portion and a portion extending substantially perpendicularly from said transverse portion, ground supporting means secured to said perpendicular portion of said frame remote from said transverse portion, a shredding mechanism pivotally secured to said transverse portion, draft means pivotally secured to said transverse portion opposite said shredding mechanism, adjusting means for adjusting the angular position of said frame relative to the ground, and means extending between said shredding mechanism and said draft means for holding said shredding mechanism in upright position.

References Cited in the file of this patent
UNITED STATES PATENTS

| 1,944,275 | Sandeen | Jan. 23, 1934 |
| 2,500,914 | Sells et al. | Mar. 14, 1950 |